P. HANSMANN.
ADJUSTABLE TONGUE.
APPLICATION FILED NOV. 30, 1908.
1,049,297.
Patented Dec. 31, 1912.
2 SHEETS—SHEET 2.
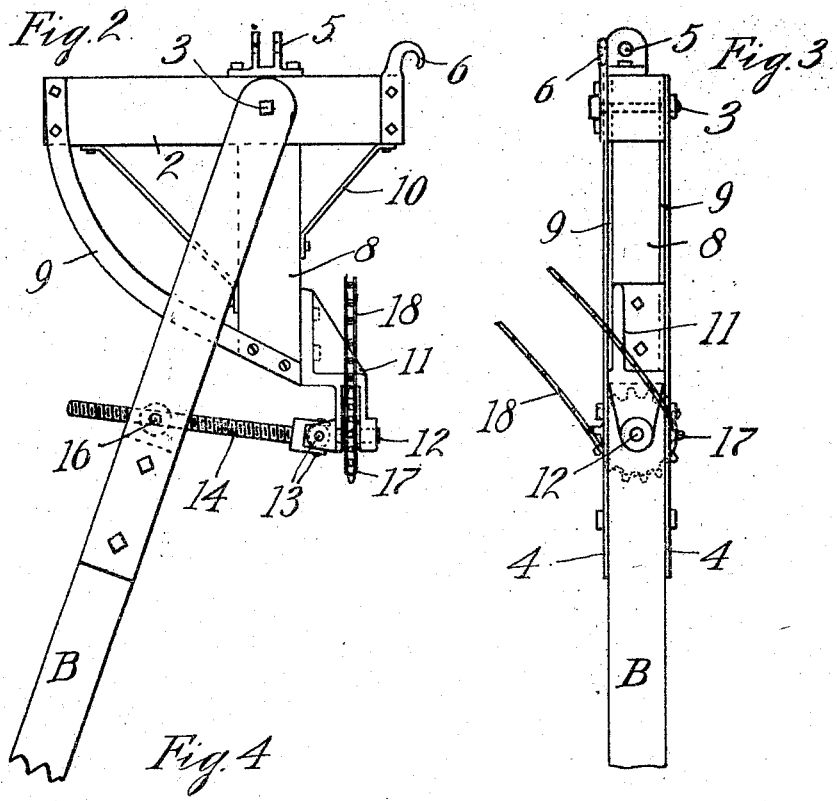
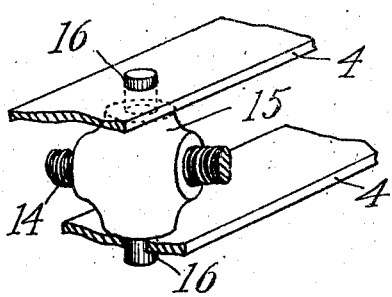
Witnesses,
George Voelker
N. Smith
Inventor,
Paul Hansmann
by Lothrop & Johnson
his Attorneys.

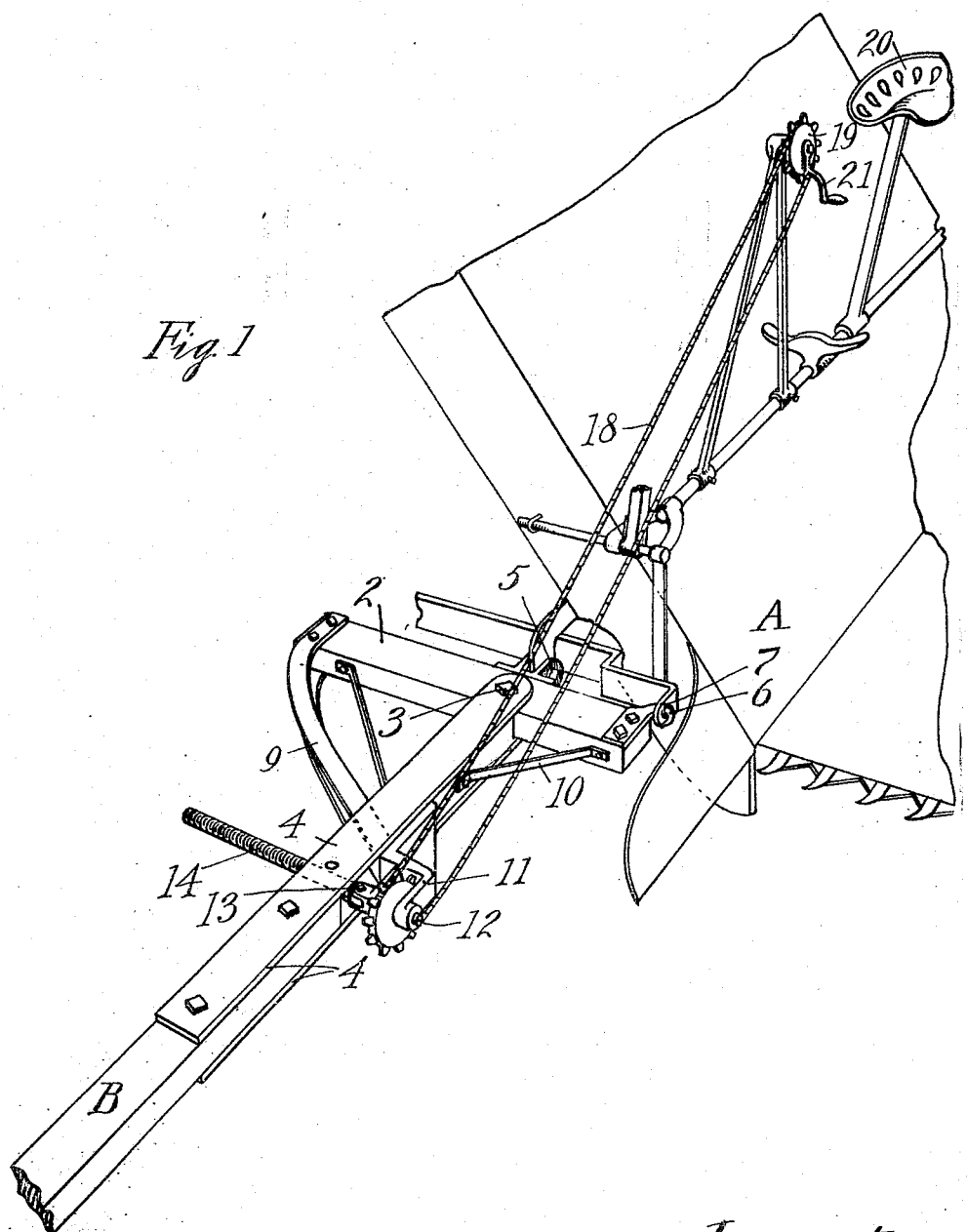

UNITED STATES PATENT OFFICE.

PAUL HANSMANN, OF LONG PRAIRIE, MINNESOTA.

ADJUSTABLE TONGUE.

1,049,297.  Specification of Letters Patent.  Patented Dec. 31, 1912.

Application filed November 30, 1908. Serial No. 465,286.

*To all whom it may concern:*

Be it known that I, PAUL HANSMANN, a citizen of the United States, residing at Long Prairie, in the county of Todd and State of Minnesota, have invented certain new and useful Improvements in Adjustable Tongues, of which the following is a specification.

My invention relates to improvements in adjustable couplings designed particularly for connecting a plurality of stripper harvesters, binders or similar machines to an engine whereby they are drawn along behind the engine each in a different path so as to cut different swaths.

To this end my invention consists of improved means for adjusting the tongue of the machine hereinafter more particularly set forth and described.

In the accompanying drawings forming part of this specification, Figure 1 is a perspective view of a portion of the front end of a binder and connected tongue fitted with my improvements, Fig. 2 is a plan view of the tongue and support embodying my improvements, Fig. 3 is a side elevation of the parts shown in Fig. 2, and Fig. 4 is a perspective view of a screw shaft support forming part of my invention.

In the drawings A represents the framework of the machine to be drawn and B the tongue. The tongue B has pivotal support on a cross bar 2 by means of a pin 3 passing through the cross bar and through the straps 4 extending rearwardly from the top and bottom faces of the tongue. The cross bar 2 may have vertical swinging connection 5 with the machine in line with the tongue and be further braced by means of a hook 6 carried by the inner end of the cross bar and fastened through an eye 7 in a portion of the vehicle construction. The cross bar carries a fixed tongue 8 extending in normal position of the parts forwardly in line with the pivotally supported tongue B. The end of the fixed tongue 8 is connected with the outer or longer end of the cross bar by curved track bars 9, the opposite side of the fixed tongue being preferably connected with the inner end of the cross bar by a strap 10.

In order to swing the tongue upon its pivot toward and away from the outer end of the cross bar I provide the following mechanism. Secured to the inner side of the forward end of the fixed tongue 8 is a bracket 11 within which the shaft 12 has journal support, the outer end of the shaft having universal joint connection 13 with the screw shaft 14. The free end of the screw shaft 14 extends through, and has threaded engagement with, a nut 15, said nut having pivotal support 16 in the plates 4. In order to turn the shaft 12 from the machine I provide the sprocket 17 secured upon the shaft and having chain connection 18 with a sprocket 19 supported adjacent to the driver's seat 20 and being provided with a suitable actuating handle 21.

It will be apparent that by means of the forwardly extending element 8 I secure a fixed base for the adjusting screw at a point forward of the pivotal support of the tongue. This permits a thrust or pull being exerted upon the tongue transversely of its length and the fixed base gives a stationary support for the hand actuated driving means leading to the machine. The screw shaft 14 has a positive driving connection with the tongue and I use the word "screw" as describing an element of mechanism having an equivalent positive driving connection with the tongue.

In operation, where it is desired to set the tongue so that the machine will travel at one side of the machine in front it is only necessary for the driver to turn the handle 21 the necessary number of revolutions. This will turn the shaft 12 through the medium of the sprocket chain turning the screw 14 and causing the nut 15 to travel outwardly upon the screw, carrying with it the tongue B. The pivotal connection 13 between the screw and shaft 12 and the pivotal support 16 for the nut compensates for the varying position of the screw. The curved bars 9 form a supporting track for the tongue B during its adjustment. In carrying the tongue back to normal position it is only necessary to oppositely turn the shaft 12 through the medium of the handle 21.

My invention is designed particularly for use in drawing stripper harvesters one behind the other across a field whereby each succeeding machine may cut a swath outside the swath cut by the next forward machine. The tongue being only adjustable away from one side of normal position I am enabled to secure a construction particularly strong and simple and with the advantage of being adjustable from the driver's seat.

I claim as my invention:

1. In combination with a cross bar, a tongue having pivotal support thereon, a fixed tongue connected with said cross bar and standing normally in line with said pivotally supported tongue, an adjusting connection between said pivoted tongue and the free end of said fixed tongue, hand operated mechanism supported at the rear of said cross bar and a driving connection between said hand mechanism and one end of said adjusting connection.

2. In combination with a cross bar, a tongue having pivotal support thereon, a rotatable shaft supported forward of the cross bar, a screw connection between one end of said shaft and said tongue, hand operative mechanism supported at the rear of the cross bar, and a driving connection between said hand mechanism and said shaft at the side of the tongue opposite to the screw mechanism.

3. In combination with a cross bar, a tongue having pivotal support thereon, a fixed tongue connected with said cross bar and standing normally in line with said pivotally supported tongue, actuating mechanism supported upon the forward end of said fixed tongue, and a screw rod connecting said actuating mechanism with the pivoted tongue.

4. In combination with a cross bar, a tongue having pivotal support thereon, a fixed tongue connected with said cross bar and extending forwardly in alinement with said pivoted tongue when in normal position, a transverse rotatable shaft supported by the forward end of said fixed tongue, a screw rod pivotally connected with said shaft and having threaded engagement with said pivoted tongue, and means for rotating said shaft.

5. In combination with a cross bar, a tongue having pivotal support thereon, a fixed tongue connected with said cross bar and extending forward in alinement with said pivoted tongue when in normal position, a transverse shaft rotatably supported by the forward end of said fixed tongue, a nut pivotally supported by said pivoted tongue, a screw rod pivotally connected with said shaft and threaded through said nut, and actuating mechanism for said shaft.

6. In combination with a cross bar, a tongue having pivotal support thereon, a fixed tongue connected with said cross bar and extending forward in alinement with said pivoted tongue when in normal position, a transverse shaft rotatably supported by the forward end of said fixed tongue, a nut pivotally supported by said pivoted tongue, a screw rod pivotally connected with said shaft and threaded through said nut, a sprocket wheel supported upon said shaft, a handled sprocket wheel supported at the rear of the cross bar and a chain connecting said sprocket wheels.

7. Means for swinging the tongue of a binder or other agricultural implement to change its line of travel, comprising a screw having pivoted traveling support transversely of the tongue, and means for actuating the screw to shift the tongue.

8. Means for swinging the pivotally supported tongue of a binder or other agricultural implement to change its line of travel, comprising a screw operably connected with, and transversely of the tongue at a point forward of its pivotal support, and means for actuating the screw to shift the tongue.

9. The combination with a vehicle and its steering frame, of a tongue pivotally supported by said frame, a frame element extending forwardly from said steering frame, and an adjusting connection between said frame and said tongue at a point forward of the pivotal support of said tongue, said adjusting connection being supported by both said frame element and tongue at a point forward of the pivotal support of said tongue.

10. The combination with a vehicle and the cross bar of its steering frame, of a tongue pivotally supported by said cross bar, a forwardly extending bracket member rigidly supported by said cross bar, and an adjusting connection between said bracket member and the adjacent portion of said tongue, said adjusting connection being supported at the one end by said bracket member, and at the other end by said tongue, at a point forward of the pivotal support of said tongue.

11. In combination with a cross bar, a tongue having pivotal support thereon, means for swinging said tongue upon its pivot toward one end of said cross bar comprising a fixed base of adjusting mechanism supported forwardly of said cross bar and at one side of said pivotal tongue, and a connection leading from said base to said tongue.

In testimony whereof I affix my signature in presence of two witnesses.

PAUL HANSMANN.

Witnesses:
H. SMITH,
H. S. JOHNSON.